United States Patent [19]

Bohannon

[11] 3,995,391
[45] Dec. 7, 1976

[54] FISHING DEVICE
[75] Inventor: Jesse E. Bohannon, Mabank, Tex.
[73] Assignee: Jesse E. Bohannon, Mabank, Tex.
[22] Filed: Sept. 18, 1975
[21] Appl. No.: 614,544
[52] U.S. Cl. .................................. 43/37; 43/89
[51] Int. Cl.² .................................. A01K 83/04
[58] Field of Search ............ 43/37, 34, 89, 15

[56] References Cited
UNITED STATES PATENTS

| 715,342 | 12/1902 | Bertholf | 43/89 |
| 793,810 | 7/1905 | Wangen | 43/89 |
| 1,340,780 | 5/1920 | Leon | 43/37 |
| 2,218,046 | 10/1940 | Maurer | 43/89 |
| 2,620,590 | 12/1952 | Shaw | 43/89 |

Primary Examiner—Warner H. Camp

[57] ABSTRACT

A fishing device has a spring steel inverted U-shaped spring member provided with two arms which terminate at their ends in double barbed hooks projecting inwardly toward each other, a baited fishing hook is suspended between the arms on strings extending horizontally between the arms such that when a fish passes between the double barbed members and nibbles at the bait on the baited hook the spring unit is activated to engage the barbed units into the fish.

1 Claim, 2 Drawing Figures

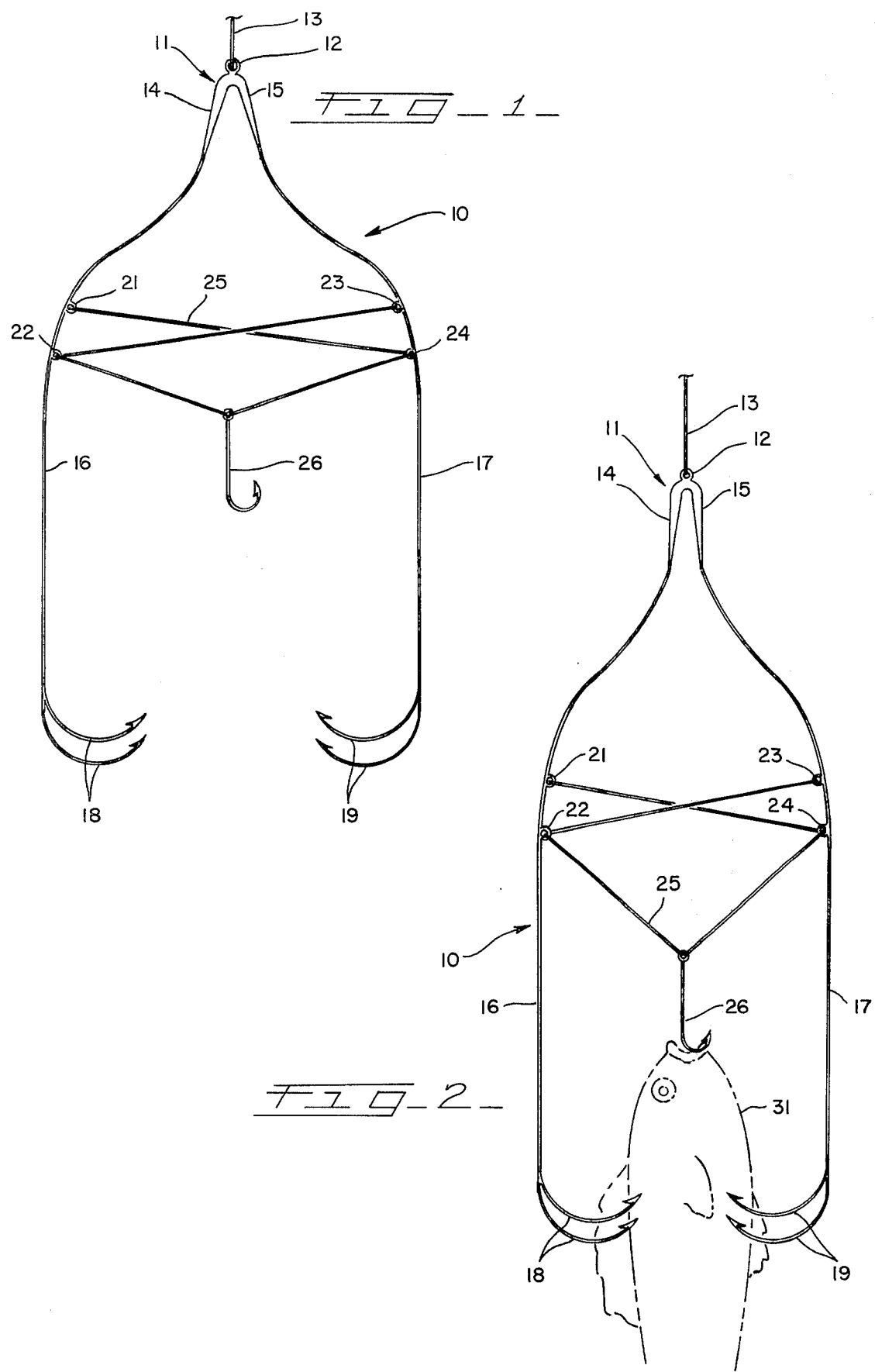

FISHING DEVICE

BACKGROUND OF THE INVENTION

1. Field of the Invention

This invention relates generally to fishing devices and more particularly to a novel device to prevent a fish from striking a conventional hook line and getting away before the hook is properly set in the mouth of the fish.

2. Description of the Prior Art

The sport of fishing has long been one of the most popular activities among individuals of all ages. A problem encountered by all fishermen is that of the fish nibbling on the bait and escaping before the hook supporting the bait can be properly caught and set in the mouth of the fish.

SUMMARY OF THE INVENTION

The present invention provides a novel fishing device to insure that once a fish begins to nibble on the bait the fish will be unable to escape, the device consisting of a pair of confronting barbed hooks suspended on arms operable under action of an inverted U-shaped spring member with the baited hook suspended from the arms such that upon passing between the arms to reach and pull upon the baited hook the spring member is activated by the fish to engage the double barbed hooks into the side of the fish to retain the fish on the device.

It is a feature of the present invention to provide a fishing device for retaining the fish on a hook after the fish once nibbles at the bait on the hook.

A further feature of the present invention provides a fishing device which is relatively inexpensive to manufacture due to its simplicity of construction.

Yet still a further feature of the present invention provides a fishing device which is easy to use and reliable and efficient in operation.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a front elevational view of the fishing device of the invention and its set position; and FIG. 2 is a front elevational view similar to FIG. 1 with the fishing device triggered by a fish to engage and retain the fish on the device.

DESCRIPTION OF THE PREFERRED EMBODIMENT

Referring now to the drawings in detail, there is illustrated a preferred form of a fishing device constructed in accordance with the principles of the present invention and which is designated generally in its entirety by the reference numeral 10.

The fishing device includes an inverted U-shaped spring steel member 11 suspended at its apex 12 by fishing line 13 and having legs 14 and 15. Each of the legs 14 and 15 terminate in outwardly directed arm extensions 16 and 17 respectively which, in turn, each terminate in double barbed hooks 18 and 19 which are directed inwardly toward each other in a confronting manner.

Disposed on the arms 16 and 17 are a series of eyes 21, 22, 23 and 24. A flexible cord 25 has one end affixed to eye 21, extends therefrom through eye 24 from whence it passes back to eye 22 from whence it passes back to eye 23 where it is tied in place. A J-shaped barbed hook 26 is suspended from the lower run of cord 25 between eyes 24 and 22 as illustrated, this being centrally of arms 16 and 17.

In operation, a fisherman suspends fishing device 10 from fishing line 13, baits hook 26, and then arches apart the spring member 11 to the position as shown in FIG. 1. Upon a fish 31 passing between hooks 18 and 19 to reach the bait suspended from hook 26, and the fish taking the bait, this pulls on cord 25 which triggers spring unit 11 to drive rigid arms 16 and 17 in a direction toward each other, this movement driving the barbed hooks 18 and 19 into the sides of the fish in a manner as illustrated in FIG. 2.

There is thus provided a novel fishing device which prevents a fish from escaping from a hook once the fish begins nibbling on the bait.

It is to be understood that the form of this invention as shown and described is to be taken as a preferred example of the invention, and that the invention is not to be limited to the exact arrangement of parts shown in the drawings or described in the description as various changes thereto in the details of construction as to size, shape and arrangement of parts may be resorted to without departing from the novel concepts of the invention.

Having thus described the invention, what is claimed is:

1. A fish device intended to be suspended from the end of a fishing line for retaining a fish on the fishing line once the fish nibbles at a baited hook, the device comprising, in combination:

an inverted U-shaped spring member having legs thereof extending downwardly from an apex portion suspended from the fishing line, a pair of arm members, each affixed at its top end to one of the leg members and extending downwardly and outwardly therefrom, a pair of double barbed hook members each affixed to the terminal free end of each arm member projecting inwardly toward each other in a confronting manner, means suspending the arm members, and means for triggering the arm members to effect the spring member to drive the arm members in a direction inwardly of each other; and a hook suspended from said arm members by means of a pair of vertically spaced apart eyes affixed to one arm member, a second pair of vertically spaced apart eyes affixed to the other arm member, a flexible cord having one end tied to one eye of one arm from whence it is trained through an eye of the other arm from whence it is trained back to the remaining eye of the first arm from whence it is trained back to the remaining eye of the second arm to which it is permanently tied thereto, the fishing hook being suspended intermediate the arm members on the run of the cord which is nearest the double barbed hook members, with the means for triggering the spring member comprising the cord which pulls the arms slightly together upon a fish nibbling on the hook, this effecting closing of the legs of the spring member to drive the double barbed hooks in a direction inwardly toward each other.

* * * * *